Dec. 23, 1969     H. ROSEN     3,485,244

EYE APPLICATOR

Filed Dec. 15, 1966

INVENTOR.

Hyman Rosen

BY

*Attorney*

United States Patent Office 3,485,244
Patented Dec. 23, 1969

3,485,244
EYE APPLICATOR
Hyman Rosen, Hewlett, N.Y., assignor of twenty-five percent to Alexander Mencher, Forest Hills, N.Y.
Filed Dec. 15, 1966, Ser. No. 602,073
Int. Cl. A61f *9/00;* A61h *33/04*
U.S. Cl. 128—254          9 Claims

ABSTRACT OF THE DISCLOSURE

The disclosure relates to the construction of an applicator for eye medicaments for use and wear as a corneal contact lens in the form of a transparent lens body having a concave and a convex side and of a size to fit or accommodate to the cornea of the eye. The lens body is provided with a pocket or channel along the concave surface, the said pocket or channel having an opening inwardly toward the concave interior for progressive or controlled release of medicaments therein to the eye by contact with the eye fluid.

---

In practice, medicinal or therapeutic treatment of the eye usually involves use of eye droppers or pipettes, bandages or patches, or like devices. Medicines directly applied to the eye by droppers are not utilized to best advantage because the tear or eye fluids forming progressive inter-mixture cause undue dilution or an immediate washing away to an extent as to materially reduce medicinal effects. Moreover, the use of a lens of the invention herein serves the combined functions as a medicament carrier or feeder, as a shield during conditions of infection or adhesions between lid and cornea and as protection against the deleterious effects on the affected eye of atmospheric elements and foreign injurious bodies carried thereby.

An object of the present invention, therefore, is to provide a transparent protective eye appliance in the form of a contact lens provided with means for carrying and gradually feeding or dispensing a medicine or medicament adapted to be taken up by the eye fluid in a continuous or progressive operation. The repetitive and progressive supply of the medicine or medicament to the eye by this means results in greater effectiveness and potency of the medicine to render its required therapeutic and soothing effects.

As hereinafter described, the medicine can be carried directly within a pocket formed as a physical part of the lens or by a channeled strip fitted within the pocket as a carrier. Moreover, the outlet or slot for the medicine can be closed by a fluid-permeable or removable closure or covering; heating and cooling means can, if desired, be provided in the body of the lens adjacent to the pocket or channel in which the medicine is contained.

These and other objects of the invention will hereinafter be described and as pointed out in the appended claims.

In the accompanying drawing, wherein illustrative embodiments of the invention are shown:

Figure 1:
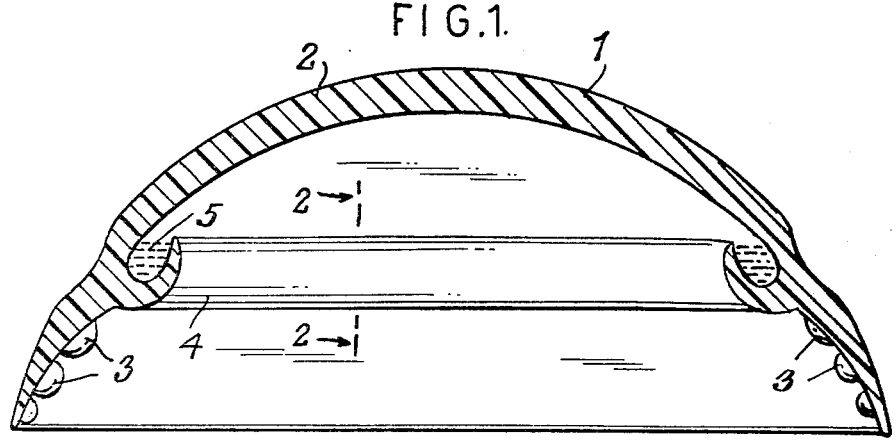
FIG. 1 is a vertical sectional field through a medicament applicator of contact lens formation.

Referring to the drawing, the contact lens 1 preferably of the corneal type is shown and is comprised of a soft transparent plastic material such as polyvinyl chloride or other inert thermoplastic composition. Adjacent central area 2 of the lens and along the periphery thereof, means are provided to dispense medicaments to the eye. The lens may have any required corrective effects if desired, or may be used solely as an applicator without sight-correcting characteristics.

The invention is applicable to all types of contact lenses, but as shown herein utilizes a lens structure shown in detail in my copending application Ser. No. 564,268 filed July 11, 1966. It is to be observed that lens 1 on the interior and adjacent the edge is provided with protuberances 3 for supporting and spacing purposes as described in said copending application.

As shown, the interior of the lens at the outer boundary of central area 2 is provided with an annular groove or pocket 4 containing a medicament 5. Such medicament may be in the form of a liquid as illustrated, or in the form of a paste, powder or the like and of such material as might be required for particular eye treatment. Pocket 4 has an outlet opening or continuous slot 6 preferably located at the top for access by eye fluid to the medicament 5 in the pocket whereby intermixture or solution takes place.

Figure 2:
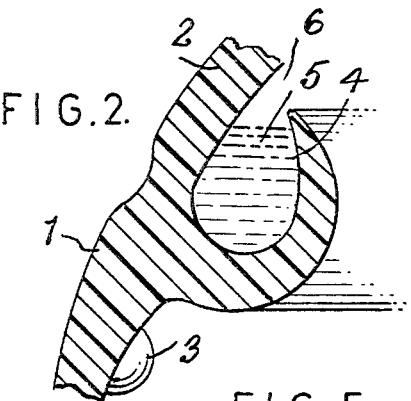
FIG. 2 is an enlarged sectional view taken substantially on the line 2—2 of FIG. 1, looking in the direction of arrows.
Figure 3:
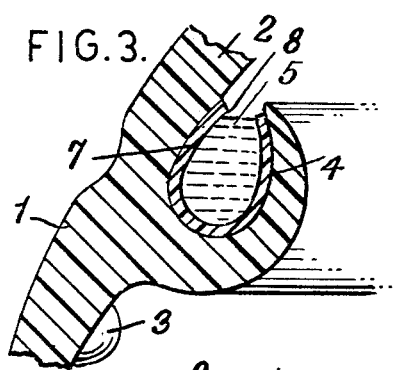
FIG. 3 is a similar sectional view, showing the pocket in the lens fitted with a medicament-containing strip.
Figure 5:
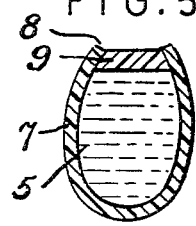
FIG. 5 is a cross section of the strip provided with closure means at the top.
Figure 4:
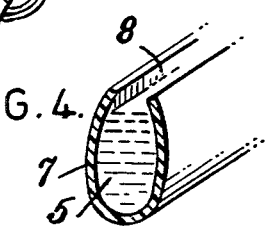
FIG. 4 is a sectional view, in perspective, of the medicament-holding strip.

In FIGS. 1 and 2 the medicament 5 is shown as being contained directly in pocket 4 in the lens. In FIGS. 4 and 5, the medicament 5 is carried by a separate channel-shaped strip 7 that is snugly fitted within the pocket 4 in the lens. Said strip 7 may be composed of any suitable material such as an inert plastic and is provided with a slot opening 8 at the top through which communication or access to the contained medicament by eye fluid can be had. With such arrangement, filling of pocket 4 or the replacement of the medicament therein is simplified since it is merely a matter of inserting the medicament filled strip in the pocket 4 of the lens. If desired, strip 7 as supplied may have the slot or open top 8 closed or covered by a removable covering that can be stripped away when the strip is inserted into the pocket 4 as shown in FIG. 5. Thus, the open top or slot 8 is shown as being closed by a covering or insert 9. Such covering or insert may be composed of a liquid-permeable material for penetration by the eye fluid to allow said fluid to reach and dissolve the medicament or else the covering or closure 9 may be made readily removable when the strip 7 is inserted into the pocket 4. It is also feasible for closure 9 to be formed of a soluble inert material.

Figure 6:
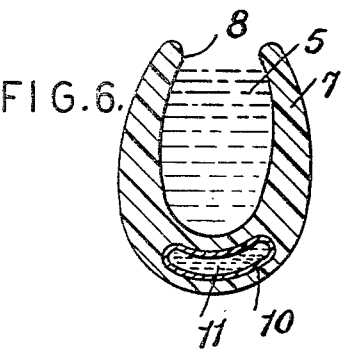
FIG. 6 shows the medicament-holding strip containing a tube for a coolant.

In FIG. 6 is shown a strip 7 containing a medicament 5 and being provided along its length with a removable insertion or embedded tube 10 containing a coolant 11 to be used in instances when an application of cold to the eye during the use of the medicament is required.

Figure 7:
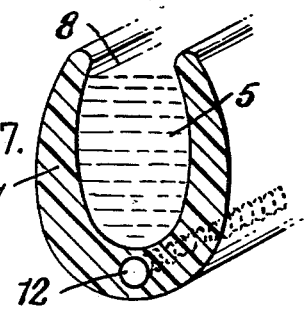
FIG. 7 shows a similar strip containing heating means.

In FIG. 7 is shown a channel strip 7 in which an electric heating coil 12 is embedded. The coil can receive the required heating current from a battery or by induction and to be used when an application of heat to the eye is desirable.

The disclosed arrangements are such that the contact lens may be used for both corrective purposes and for the supply of the medicament, or used solely as an applicator.

When lens 1 (which preferably has a flexible central portion 2) is fitted on the eye, same is spaced therefrom and supported by means of protuberances 3 spaced to furnish channels for permitting collection and circulation of eye fluid behind the lens. Progressive intermixture and circulation with the medicament 5 takes place. Moreover lens 1 with its collection of fluid with or without the medicament aids in the correction of corneal surface astigmatism and irregularity and provides for comfort in the wear of the lens. Conditions of edema produced by colds, menstrual periods and fluids imbalance; and use of the lens as a shield during conditions of infection or adhesions between lid and cornea are accommodated by the invented structure.

The arrangement described is such that a lens of this kind can be economically produced and hence can be sold cheaply and discarded after a relatively short period of use. The structure of the lens is such that fitting procedure is greatly simplified so that the lens can be fitted quickly and by persons with relatively little optical experience.

The applicator 1 may have a correcting lens for mounting in an indentation in central area 2. Moreover, the applicator structure above described may be applied to artificial corneas as described in my U.S. Patent 2,952,023 dated Sept. 13, 1960.

I wish it understood that minor changes and variations in the structure, material, location, integration and number of parts may all be resorted to without departing from the spirit of the invention and the scope of the appended claims.

What I claim is:

1. An applicator for eye medicaments comprising a transparent lens body having a concave and convex side for wearing as a contact lens and of a size so as to fit the cornea of an eye and having a pocket on the surface of the concave side, said pocket having an opening inwardly toward the concave interior portion of said transparent lens body and containing a medicament whereby to enable the medicament to be progressively released through said opening to the eye by its contact with eye fluid.

2. An applicator according to claim 1, wherein the pocket is in the form of an annular chanel extending around the lens body on the surface of the concave side and the opening thereof constituting the top of the channel.

3. An applicator according to claim 1, wherein the medicament is contained in a channel-shaped strip open at the top and located within the lens body and fitted in the pocket.

4. An applicator according to claim 3 wherein the open top of the channel-shaped strip is closed by a fluid-permeable material.

5. An applicator according to claim 3, wherein a channel to receive a coolant is provided in the channel-shaped strip.

6. An applicator according to claim 3, wherein heating means is provided in the strip.

7. An applicator for a medicament comprising a transparent lens body having a concave and convex side for wear and use as a contact lens and of a size so as to fit the cornea of an eye and provided inwardly of its circumferential edge with an annular pocket on the surface of the concave side forming a continuous channel around the lens body, said pocket containing a medicament, the pocket having an opening inwardly toward the concave interior portion of said transparent lens body to provide a slot opening through which access is had to the medicament by eye fluid.

8. An applicator according to claim 7, wherein the medicament is contained in a channel-shaped strip fitted within the pocket, the strip having a slot opening at the top for access to the medicament.

9. An applicator according to claim 8, wherein the strip is closed at the top by a removable closure strip.

References Cited

UNITED STATES PATENTS

| | | | |
|---|---|---|---|
| 2,347,488 | 4/1944 | Lawlor et al. | 128—260 |
| 2,525,381 | 10/1950 | Tower | 128—172.1 |
| 3,302,646 | 2/1967 | Behney | 128—260 |

RICHARD A. GAUDET, Primary Examiner

J. D. YASKO, Assistant Examiner

U.S. Cl. X.R.

128—260; 351—160